United States Patent
Toledano et al.

(10) Patent No.: US 10,318,740 B2
(45) Date of Patent: Jun. 11, 2019

(54) SECURITY RISK SCORING OF AN APPLICATION

(71) Applicant: HEWLETT PACKARD ENTERPRISE DEVELOPMENT LP, Houston, TX (US)

(72) Inventors: Yaniv Toledano, Yehud (IL); Tomer Gershoni, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 164 days.

(21) Appl. No.: 15/326,991

(22) PCT Filed: Jul. 30, 2014

(86) PCT No.: PCT/US2014/048834
§ 371 (c)(1),
(2) Date: Jan. 17, 2017

(87) PCT Pub. No.: WO2016/018289
PCT Pub. Date: Feb. 4, 2016

(65) Prior Publication Data
US 2017/0213037 A1    Jul. 27, 2017

(51) Int. Cl.
*G06F 21/00*  (2013.01)
*G06F 21/57*  (2013.01)
(Continued)

(52) U.S. Cl.
CPC .......... *G06F 21/577* (2013.01); *G06F 21/552* (2013.01); *G06F 21/56* (2013.01);
(Continued)

(58) Field of Classification Search
None
See application file for complete search history.

(56) References Cited

U.S. PATENT DOCUMENTS

| 8,533,843 B2 | 9/2013 | Levi |
| 8,539,586 B2 | 9/2013 | Stephenson |

(Continued)

FOREIGN PATENT DOCUMENTS

| KR | 20050100278 A | 10/2005 |
| WO | WO-2007053630 A2 | 5/2007 |
| WO | WO-2011105659 A1 | 9/2011 |

OTHER PUBLICATIONS

Das, R. et al., "Software Selection Based on Quantitative Security Risk Assessment," (Research Paper), May 23, 2013, pp. 45-56, available at http://research.ijcaonline.org/ciis/number1/ciis1013.pdf.

(Continued)

*Primary Examiner* — Andrew J Steinle

(57) ABSTRACT

In one implementation, a system for risk scoring a software application includes a component score engine to calculate an impact component score and a likelihood component score for a security vulnerability during development of the software application based on a plurality of scored descriptions of security risk elements for the software application. In addition, the system includes a total risk score engine to calculate a total security risk score for the software product application on the impact component score and the likelihood component score for the security vulnerability of the software application. In addition, the system includes a risk characterization engine to assign a risk characterization to the software product based on where the total risk score falls within a predetermined scale.

19 Claims, 5 Drawing Sheets

(51) Int. Cl.
*G06F 21/62* (2013.01)
*G06F 21/60* (2013.01)
*H04L 29/06* (2006.01)
*G06F 21/55* (2013.01)
*G06F 21/56* (2013.01)

(52) U.S. Cl.
CPC ........ *G06F 21/606* (2013.01); *G06F 21/6209* (2013.01); *H04L 63/06* (2013.01); *G06F 2221/033* (2013.01)

(56) References Cited

U.S. PATENT DOCUMENTS

| | | |
|---|---|---|
| 2009/0126012 A1 | 5/2009 | Treadwell et al. |
| 2011/0138471 A1* | 6/2011 | Van De Weyer ..... G06F 21/554 726/25 |
| 2013/0253979 A1* | 9/2013 | Williams ........... G06Q 10/0635 705/7.28 |
| 2013/0325678 A1 | 12/2013 | Cheng et al. |
| 2014/0019196 A1* | 1/2014 | Wiggins ............. G06Q 10/0635 705/7.28 |
| 2014/0137257 A1* | 5/2014 | Martinez ............. H04L 63/1433 726/25 |
| 2014/0173737 A1 | 6/2014 | Toback et al. |
| 2017/0200006 A1 | 7/2017 | Gershoni |

OTHER PUBLICATIONS

International Search Report & Written Opinion received in PCT Application No. PCT/US2014/048834, dated Mar. 16, 2015, 11 pages.

United States General Accounting Office, "Information Security Risk Assessment Practices of Leading Organizations," (Research Paper), Accounting and Information Management Division, Nov. 1999, 50 pages, available at http://www.gao.gov/special.pubs/ai00033.pdf.

Leblanc, David, DREADful, Aug. 2007 (3 pages).

National Institute of Standards and Technology, NVD Common Vulnerability Scoring System Support v2 dated on or before Jul. 26, 2018 (4 pages).

* cited by examiner

SECURITY RISK SCORING OF AN APPLICATION

BACKGROUND

A risk can be defined as a product of likelihood and impact of an event. Risk can be scored via utilizing various inputs to quantify a risk associated with a particular aspect of a product (e.g., a security risk associated with exploitation of a security vulnerability). Scoring risk can be useful in an information technology (IT) environment. For example, scoring risk associated with exploitation of a security vulnerability can contribute to accurately managing and assessing security risks of a software application.

DETAILED DESCRIPTION

Figure 1:
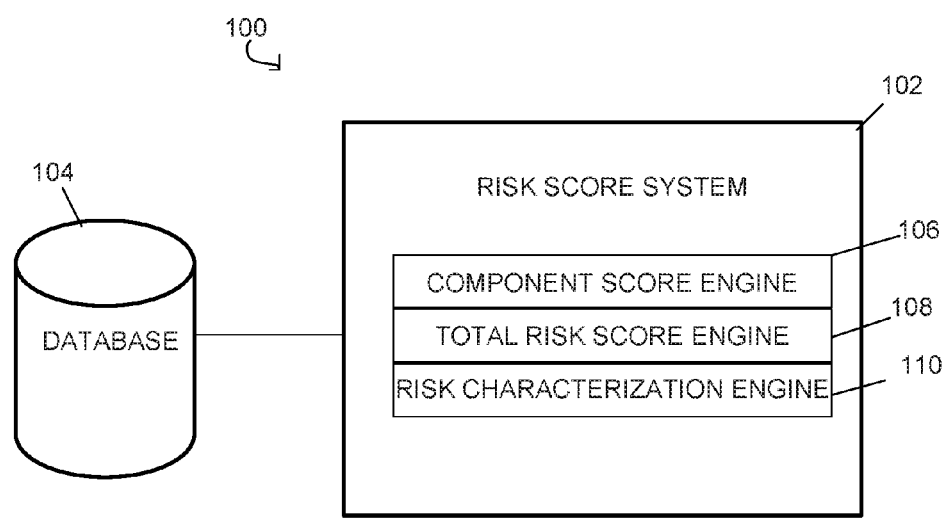
FIG. 1 illustrates a diagram of an example of a system for risk scoring of a software application according to the present disclosure.

Developing and maintaining systems and applications can include identifying and managing risks associated with the systems and applications. Systems and applications can be associated with an array of risks (e.g., security risks, failure risks, cost risks, reputation risks, etc.). A type of risk associated with a system or application can depend on the functionalities of the application or system, the components comprising the application or system, the vulnerabilities of the application or system, and/or other characteristics associated with development and maintenance.

Effectively managing risk can include utilizing risk assessment tools to effectively identify and address vulnerabilities (e.g., security vulnerabilities) in a system or application. Risk assessment tools can be used to identify vulnerabilities associated with an application or system, analyze vulnerabilities associated with an application or system, and calculate a score based on the analysis. A score calculated from analysis of vulnerabilities can comprise a portion of a risk assessment.

Information technology (IT) environments can include systems and applications that are subject to an array of risks (e.g., failure of code, failure of hardware, failure of resources, exploitation of security vulnerabilities, etc.). For example, IT infrastructure and IT software applications can include a vulnerability which can be exploited, thereby exposing the IT infrastructure and IT application to risk. Developing and maintaining IT infrastructure and IT applications effectively while protecting the component assets of the infrastructure and applications can include identifying, analyzing, and quantifying the associated vulnerabilities and risks.

Conventional methods associated with identifying vulnerabilities utilize post-hoc analysis of infrastructure. That is, methods for assessing the severity of computer system security vulnerabilities analyze and quantify vulnerabilities based on existing vulnerabilities identified in existing completed systems or applications. These methods utilize manipulation of the infrastructure including exercising an exploit in the infrastructure as a portion of the analysis and quantification.

In contrast, the embodiments of the present disclosure describe a system, method, and computer readable medium for evaluating and scoring application security risks throughout development of the application.

As used herein, an application includes a software application. A software application can include application programs deployed on a customer premise, software as a service, a cloud managed service provided application program, a mobile application, and/or any other computer readable instructions executable by a processing resource to implement a desired function.

At various points during development of the application, the application can be analyzed. The application can be analyzed by an analyzing utility that collects inputs regarding a vulnerability (e.g., security vulnerabilities) of the application. The input may be identified and/or detected by the utility itself and/or by inputs received from an application development team, application architect and/or application manager. The analyzing utility can be a risk assessment calculator. As used herein, a risk assessment calculator is an application that receives inputs related to security vulnerabilities of the application being analyzed. The risk assessment calculator can assess a risk associated with the application (e.g., exploitation of a security risk associated with the software application) being analyzed based on application standards particular to the software application being analyzed.

Figure 2:
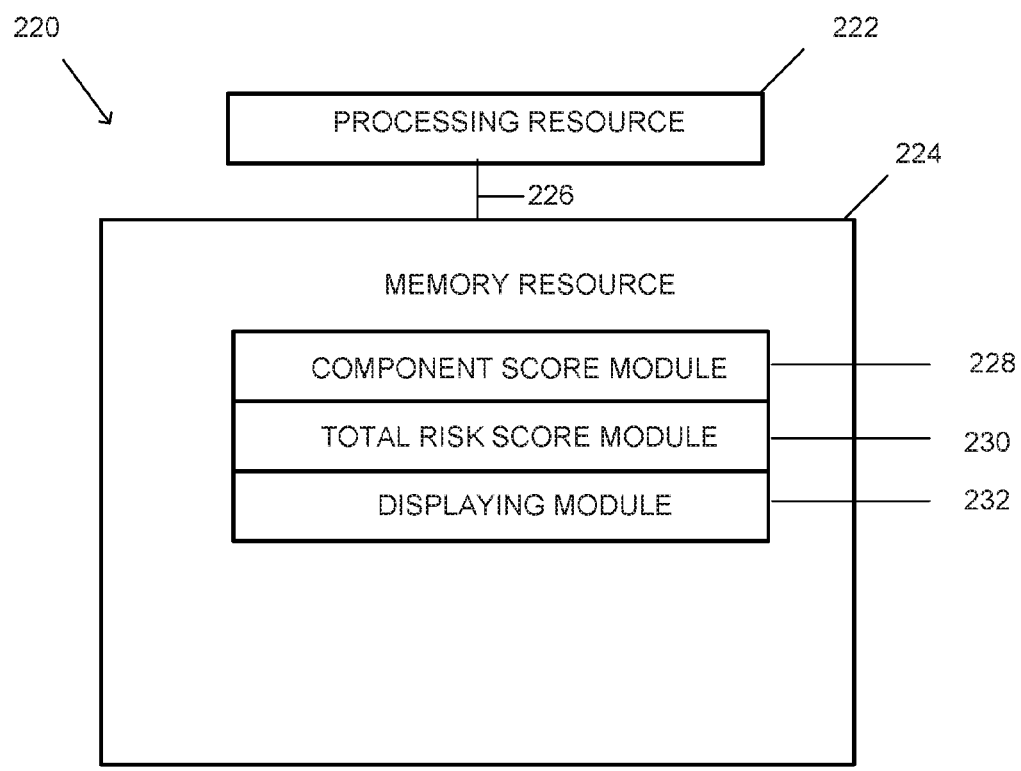
FIG. 2 illustrates a diagram of an example computing device according to the present disclosure.

FIGS. 1 and 2 illustrate examples of system 100 and computing device 220 according to the present disclosure. FIG. 1 illustrates a diagram of an example of a system 100 for risk scoring of a software application according to the present disclosure. The system can include a database 104, a risk score system 102, and/or a number of engines (e.g., component score engine 106, total risk engine 108, risk characterization engine 110). The risk score system 102 can be in communication with the database 104 via a communication link, and can include the number of engines (e.g., component score engine 106, total risk engine 108, risk characterization engine 110). The risk score system 102 can include additional or fewer engines than are illustrated to perform the various functions as will be described in further detail.

The number of engines (e.g., component score engine 106, total risk engine 108, risk characterization engine 110) can include a combination of hardware and programming, but at least hardware, that is configured to perform functions described herein (e.g., calculate an impact component score and a likelihood component score for a security vulnerability during development of a software application based on a plurality of scored descriptions of security risk elements for the software application, calculate a total security risk score for the software product application on the impact component score and the likelihood component score for the security vulnerability of the software application, assign a risk characterization to the software product based on where the total risk score falls within a predetermined scale, etc.). The programming can include program instructions (e.g., software, firmware, etc.) stored in a memory resource (e.g., computer readable medium, machine readable medium, etc.) as well as hard-wired program (e.g., logic).

The component score engine 106 can include hardware and/or a combination of hardware and programming, but at least hardware, to receive a score input. A score input can be received during the development of the software application (e.g., during planning, implementation, testing, documenting, deploying, maintaining, etc.). As used herein, a score input includes a description of a security risk element for the software application. A score input can be received as a response to a question addressing a segment of a comprehensive security coverage framework. The response can include a selection of a description from a number of predetermined descriptions that each describe an answer to the question posed to a user device and/or included as part of an assessment of a software application. The number of predetermined descriptions can include a set of predetermined descriptions each providing a portion of coverage of a range, scale, and/or continuum of possible classifications of a potential exploiting of a security vulnerability of the software application as it relates to a security risk element addressed in the question. As used herein, the descriptions can include characterizations of security metrics useful in classifying and/or quantifying security risk elements.

A question addressing a segment of a comprehensive security coverage framework can include a query about a security metric of a plurality of security metrics. The plurality of security metrics can cumulatively classify and/or quantify a plurality of segments of a comprehensive security coverage framework. The plurality of segments of a comprehensive security coverage framework can represent components of a composite risk index including an impact component representing an impact of a risk event (e.g., exploitation of a security vulnerability) and a likelihood component including a probability of a risk event (e.g., exploitation of a security vulnerability) occurrence.

The risk assessment framework can include a composite risk index including an impact component representing an impact of a risk event and a likelihood component including a probability of a risk event occurrence. The impact component and likelihood component can also be scored based on the aforementioned scored segments. For example, the impact component can be scored based on the impact potential segment score and the identify and exploit segment score. The impact component score can be a sum of a weighted impact potential segment score and a weighted identify and exploit segment score. For example, the impact component can be a sum of the impact potential segment score with a seventy percent weighting and the identify and exploit segment score with a thirty percent weighting.

Additionally, the likelihood component can be scored based on the reconstructing segment score, the attack vectors segment score, and the coverage spread segment score. For example, the likelihood component score can be an arithmetic mean of the reconstructing segment score, the attack vectors segment score, and the coverage spread segment score.

The total risk score engine 108 can include hardware and/or a combination of hardware and programming, but at least hardware, to calculate a total security risk score for the software application. As used herein, a total risk score can include a score associated with a risk assessment of software design risks originating as part of the early stages of software application development (e.g., potential risks) and/or vulnerabilities or software security exploits including risks originating in actual "hands on" checks of a product.

The total risk score for the software application can be based on the impact component score and/or the likelihood component score. For example, the total risk score can be based on the product of multiplying the impact component score and the likelihood component score. The total risk score can, for example, be the sum of the product of multiplying the impact component score by the likelihood component score and the number 1. In such examples, the total risk score is a number between 2 and 10.

The risk characterization engine 110 can include hardware and/or a combination of hardware and programming, but at least hardware, to assign a risk characterization to the software application based on where the total risk score falls within a predetermined scale. The predetermined scale can be modified by a user device. For example, the predetermined scale can be modified by a user device based on an organizational and/or security aspect associated with the software application. The predetermined scale can be modified by a user device to account for a maturity of a software product and/or an organization. As an application and/or an organization mature, the tolerance for risk can decrease or increase. The predetermined scale can be modified to reflect the tolerance change. For example, if the tolerance for risk increases, the predetermined scale can be modified to allow higher total risk scores (e.g., total risk scores falling higher within the predetermined scale) to be assigned a lower risk characterization.

FIG. 2 illustrates a diagram of an example computing device 220 according to the present disclosure. The computing device 220 can utilize software, hardware, firmware, and/or logic to perform functions described herein.

The computing device 220 can be any combination of hardware and program instructions configured to share information. The hardware, for example, can include a processing resource 222 and/or a memory resource 224 (e.g., computer-readable medium (CRM), machine readable medium (MRM), database, etc.). A processing resource 222, as used herein, can include any number of processors capable of executing instructions stored by a memory resource 224. Processing resource 222 may be implemented in a single device or distributed across multiple devices. The program instructions (e.g., computer readable instructions (CRI)) can include instructions stored on the memory resource 224 and executable by the processing resource 222 to implement a desired function (e.g., calculate an impact component score and a likelihood component score of a security vulnerability the software application based on a plurality of scored segments of a comprehensive security coverage framework, calculate a total security risk score for the software application based on the impact component score and the likelihood component score for the security risk of the software product, display a risk characterization of the software application determined based on the relationship of where the total security risk score lies within a predetermined scale, etc.).

The memory resource 224 can be in communication with the processing resource 222 via a communication link (e.g., a path) 226. The communication link 226 can be local or remote to a machine (e.g., a computing device) associated with the processing resource 222. Examples of a local communication link 226 can include an electronic bus internal to a machine (e.g., a computing device) where the memory resource 224 is one of volatile, non-volatile, fixed, and/or removable storage medium in communication with the processing resource 222 via the electronic bus.

A number of modules (e.g., component score module 228, total risk score module 230, display module 232) can include CRI that when executed by the processing resource 222 can perform functions. The number of modules (e.g., component score module 228, total risk score module 230, display module 232) can be sub-modules of other modules. For example, the display module 232 and the total risk score module 230 can be sub-modules and/or contained within the same computing device. In another example, the number of modules (e.g., component score module 228, total risk score module 230, display module 232) can comprise individual modules at separate and distinct locations (e.g., CRM, etc.).

Each of the number of modules (e.g., component score module 228, total risk score module 230, display module 232) can include instructions that when executed by the processing resource 222 can function as a corresponding engine as described herein. For example, the component score module 228 can include instructions that when executed by the processing resource 222 can function as the component score engine 106. In another example, the total risk score module 230 can include instructions that when executed by the processing resource 222 can function as the total risk score engine 108. In another example, the display module 232 can include instructions that when executed by the processing resource 222 can function as the risk characterization engine 110.

The component score module 228 can include CRI that when executed by the processing resource 222 can calculate an impact component score and a likelihood component score of a security vulnerability of the software application based on a plurality of scored segments of a comprehensive security coverage framework. The plurality of scored segments can include an impact potential segment, a reconstructing segment, and attack vectors segment, a coverage spread segment, and an identify and exploit segment. A comprehensive security coverage framework can include an impact component representing a potential impact of exploitation of a security vulnerability and a likelihood component can include a probability of an exploitation of a security vulnerability for a software application under development. The impact component and likelihood component can be scored based on the aforementioned scored segments. For example, the impact component can be scored based on the impact potential segment score and the identify and exploit segment score. Additionally, the likelihood component can be scored based on the reconstructing segment score, the attack vectors segment score, and the coverage spread segment score.

The impact potential segment, a reconstructing segment, and attack vectors segment, a coverage spread segment, and an identify and exploit segment can each be scored based on a number of corresponding scored descriptions of security risk metrics selected in response to questions addressing security risk elements of the segments of a comprehensive security coverage framework. For example, the scored segment of the plurality of scored segments can be an impact potential segment, scored based on a selected scored description of a type and a sensitivity of data that could be improperly accessed by exploiting the security vulnerability, a selected scored description of a level of control ceded and a corresponding amount of integrity damage incurred by an exploitation of the security vulnerability, and/or a selected scored description of an impact of an exploitation of the security vulnerability on availability of the software application. The descriptions can include a characterization of type of data and a sensitivity of data that can be disclosed during exploitation of the security vulnerability within a continuum of data types and sensitivities including none, trivial data, public data, sensitive data and/or top sensitive assets. The descriptions can also include quantification of data (e.g., amount of data units, portion of data, percentage of data, etc.) of each type and/or sensitivity that can be disclosed during exploitation of the security vulnerability. Further, the descriptions can include a characterization of level of control ceded and a corresponding amount of integrity damage incurred by an exploitation of the security vulnerability within a continuum including none, spoofing of public information including to minor damage to a core business and/or customer data, partial impersonation including unauthorized changes of data leading to an intermediate level of damage to a core business and/or customers data, and/or server takeover including persistent defacement and full impersonation leading to major damage to the core business and/or customer data. The descriptions can also include quantifications of the level of control ceded and/or resulting damage. The descriptions can include a characterization of an availability impact of exploitation of the security vulnerability within a continuum including none, DoS for a small amount of users for a short time with no business effect, Temporary DoS for a limited group of users for a limited amount of services resulting in partial data loss, and/or DoS for whole software application or critical services for a long period of time for a large portion of users resulting in major data loss. The descriptions can also include quantification of an amount/portion of effected users, an amount of time availability is affected, a portion of the software application with availability affected, and/or an amount of data loss resulting from exploitation of the security vulnerability.

In another example, the scored segment of the plurality of scored segments can be a reconstructing segment, scored based on a selected scored description of a reproducibility of a security vulnerability and/or its exploit. The descriptions can include a characterization of the difficulty is reproducing an exploitation of the security vulnerability within a continuum including rare (e.g., difficult to reproduce even when well known, etc.), limited (e.g., ability to reproduce during a limited time window, reproduction involves some preconditions, etc.), and/or easily reproducible (e.g., exploit available for a large time window, requires minimal preconditions, always available, etc.). The descriptions can also include quantification of an amount/portion of ability and/or preconditions to reproduce an exploitation of the security vulnerability.

In another example, the scored segment of the plurality of scored segments can be an attack vectors segment, scored based on a selected scored description of a skill level associated with an exploitation of the security vulnerability of the software application and/or a selected scored description of a level of access to exploit the security vulnerability of the software application. The descriptions can include a characterization of skills, tools and/or efforts involved in exploiting a security vulnerability of the software application within a continuum including difficult (e.g., involving high-level programming and/or hacking skills, involving internal knowledge of the software application and/or its resources, involving a large time commitment to exploit, involving sophisticated and/or obscure tools to exploit, etc.), intermediate (involving some programming and/or hacking skills, involving a few hours to a few days to prepare an exploit, once exploited then easily repeated, etc.), and/or easy (involving no or limited programming and/or hacking skills, using common out of the box exploiting tools, involving reusable public exploits, involving a short time to exploit, etc.). The descriptions can also include quantification of an amount/portion of preconditions, skills, time windows, and or utilities involved in exploitation of the security vulnerability of the software application.

In another example, the scored segment of the plurality of scored segments can be a coverage spread segment, scored based on a selected scored description of at least one of a tenant and a user affected by an exploitation of the security vulnerability of the software application. The descriptions can include a characterization of the level of tenants and/or users affected by a an exploitation of a security vulnerability within a continuum including none (e.g., has no effect on users, software application is a non-software as a service product, etc.), small number (e.g., a single tenant, a single user, a small group of tenants, a small group of users, etc.), an intermediate number (e.g., a quantity and/or portion of users considered above a small number but below a large number, a quantity and/or portion of tenants considered above a small number but below a large number, etc.), and/or a large number (e.g., a quantity and/or portion of users exceeding an intermediate amount, a quantity and/or portion of tenants exceeding an intermediate amount, all users, all tenants, etc.). The descriptions can also include quantification of an amount/portion of tenants and/or users affected by an exploitation of the security vulnerability of the software application.

In yet another example, the scored segment of the plurality of scored segments can be an identify and exploit segment, scored based on a selected scored description of a level of skill to identify the security vulnerability and a level of accessibility associated with a vulnerable surface of the software application. The descriptions can include a characterization of the skills involved in identifying an exploit of a security vulnerability of the software application within a continuum including uncommon skills (e.g., skills involved in identifying the exploit are not common in the population, the skills involved in identifying the exploit are acquired through a substantial amount of training and/or education, identification involves a large amount of manual programming and/or hacking, etc.), common skills (e.g., techniques and/or knowledge that exist among a significant portion of the population, identification involves some manual programming and/or hacking, etc.), and/or very common (e.g., little to no skill involved in identifying, exploits are well documented publicly, identifying the exploit involves easy to use and/or free tools, etc.). The descriptions can also include quantification of an amount/portion of skill, effort, and/or knowledge involved in exploitation of the security vulnerability of the software application.

The descriptions can include a characterization of the accessibility of an attack surface for the exploit of a security vulnerability of the software application within a continuum including highly protected (e.g., significant security measures in place, the attack surface is house in an obscure functionality of the software application, etc.), protected (e.g., some security measured in place, availability to limited groups of users depending on licensing and configuration, etc.), and/or public (e.g., attack surface is found in most and/or all pages of the software application, attack surface is in an public and/or minimally secure area, attack surface is found in most common features of the software application, the attack surface can be found by most or all users, etc.). The descriptions can also include quantification of an amount/portion of security for an attack surface and/or prevalence of an attack surface in a software application.

The total risk score module 230 can include CRI that when executed by the processing resource 222 can calculate a total security risk score for the software application based on the impact component score and the likelihood component score for the security risk of the software product. The total risk score for the software application can be based on the impact component score and/or the likelihood component score. For example, the total risk score can be based on the product of multiplying the impact component score and the likelihood component score. The total risk score can, for example, be the sum of the product of multiplying the impact component score by the likelihood component score and the number 1.

The display module 232 can include CRI that when executed by the processing resource 222 can display a risk characterization of the software application determined based on where the total security risk score lies within a predetermined scale. Displaying can include generating a report and/or graphical representation containing the risk characterization, the underlying total risk score, the underlying risk element scores, and/or the underlying descriptions of risk element metrics to be displayed on a user device, printed, and/or exported to complete further calculations. Additionally, displaying can include saving (e.g., storing in a database, etc.) the characterization, the underlying total risk score, the underlying risk element scores, and/or the underlying descriptions of risk element metrics as a historical data point. In another example, displaying can include comparing the characterization and/or underlying total risk score to historical characterizations and/or underlying scores for the same software application (e.g., the same instance, a separate instance of the same software application, a different version of the same software application, etc.) and/or a different software application (e.g., a related software application, another software application in a multi-asset environment, etc.). Displaying can include generating a report and/or graphical representation containing the results of the comparison. That is, the report and/or graphical representation can include trends and/or projections resulting from the comparison of the characterization and/or underlying total risk of a current software application to a historical data point. Displaying can also include displaying suggestions (e.g., a risk reduction plan) for modifying the software application and/or its development in a manner that will reduce the risk characterization, the underlying total risk score, the underlying risk element scores, and/or the underlying descriptions of risk element metrics. The suggestions can be based on historical data points, projections, and or predetermined risk mitigation measures.

Figure 3:
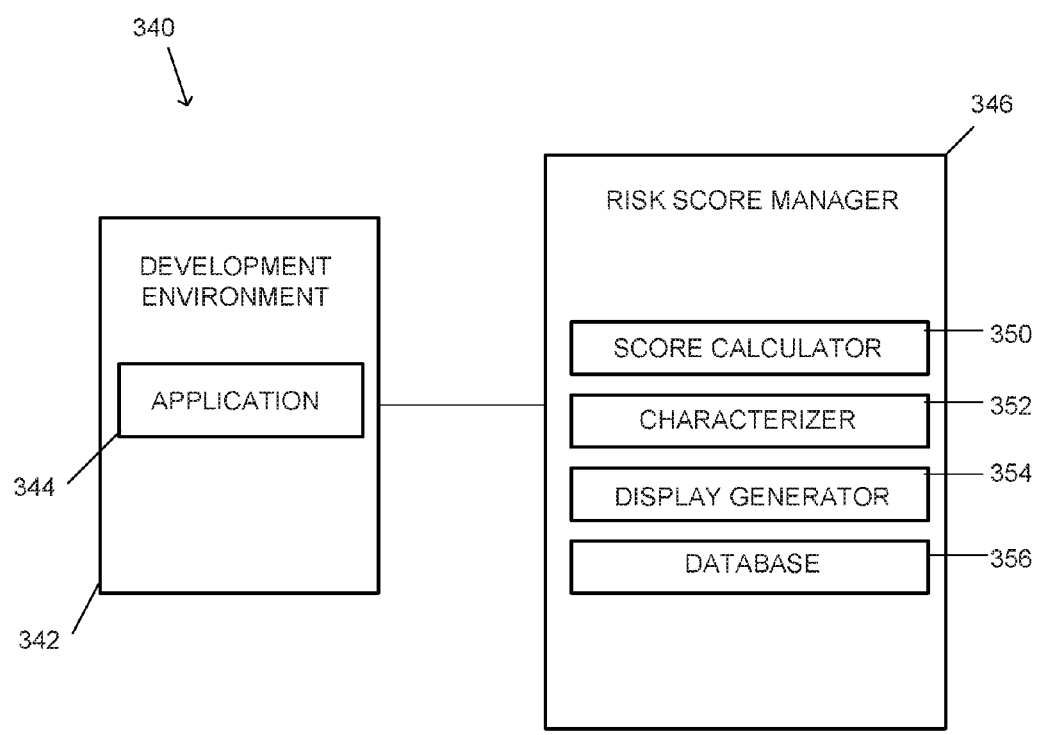
FIG. 3 illustrates an environment for risk scoring of a software application according to the present disclosure.

FIG. 3 is an example environment 340 for evaluating software application security risks throughout development. The environment 340 is shown to include a development environment 342, an application 344, a risk score manager 346, a score calculator 350, a characterizer 352, a display generator 354, and a database 356.

The environment 340 can include a development environment 342. The development environment 342 can include a release manager that manages the process of developing an application 344 (e.g., a software application). The development environment 342 can include a number of sub-environments and/or tiers. For example, the development environment 342 can include a planning environment (e.g., an environment for planning a software application and/or its projected functionalities), local environment (e.g., a desktop and/or workstation of a developer), a development environment (e.g., a sandbox, a testing environment that allows for experimentation with code changes, test server, etc.), an integration environment (e.g., an environment for continuous integration to a build target, etc.), a test environment (e.g., an environment for performance testing and/or quality assurance testing), user acceptance testing environment (e.g., beta testing, etc.), a pre-production environment (e.g., an environment mirroring a production environment), and/or a production environment (e.g., serving end-users, etc.). The development environment 342 can include a number of software developers and/or developers' devices.

The environment 340 can include a risk score manager 346. The risk score manager 346 can be a software application vulnerability scoring toolbar. The risk score manager 346 can include software, firmware, and/or hardware for assessing a security vulnerability of an application 344. The risk score manager 346 can include instructions and/or commands for utilizing processing resources to perform an assessment of a security vulnerability of an application 344. The risk score manager 346 can be stored on a computing device, on a database, and/or on another storage medium. The instructions of the risk score manager 346 can be executed by processing resources of a computing device on which it is stored, by processing resources associated with a database, and/or by other processing resource. The risk score manager 346 can be a virtual applicant running ion a virtual machine in a cloud system.

The score calculator 350 can generate outputs and receive inputs. For example, the score calculator 350 can generate outputs including prompts to select a description from a plurality of provided descriptions of security metrics associated with security risk elements. The score calculator 350 can receive a selected description as an input. Alternatively, the score calculator 350 can receive raw characterizations of security metrics associated with security risk elements of an application 344. The inputs can be generated in the development environment 342 and/or by a separate user device (not shown). The inputs can, for example, be generated at any stage of the development and release of the application 344 and can be based on questions posed to developers and/or from data collected in the development environment 342.

The inputs can include score inputs. A score input can be received during the development of the application 344 (e.g., during planning, implementation, testing, documenting, deploying, maintaining, etc.). As used herein, a score input includes a description of a security risk element for the application 344. A score input can be received as a response to an output (e.g., a question addressing a segment of a comprehensive security coverage framework). The response can include a selection of a description from a number of predetermined descriptions that each describe an answer to the question posed to a user device and/or included as part of an assessment of an application 344. The number of predetermined descriptions can include a set of predetermined descriptions each providing a portion of coverage of a range, scale, and/or continuum of possible classifications of a potential exploiting of a security vulnerability of the application 344 as it relates to a security risk element addressed in the question. As used herein, the descriptions can include characterizations of security metrics useful in classifying and/or quantifying security risk elements.

The outputs can include questions. The questions can address segments of a comprehensive security coverage framework by addressing a security metric of a plurality of security metrics. The plurality of security metrics can cumulatively classify and/or quantify a plurality of segments of a comprehensive security coverage framework. The plurality of segments of a comprehensive security coverage framework can represent components of a composite risk index including an impact component representing an impact of a risk event (e.g., exploitation of a security vulnerability) and a likelihood component including a probability of a risk event (e.g., exploitation of a security vulnerability) occurrence.

The plurality of segments of a comprehensive security coverage framework can include an impact potential segment, a reconstructing segment, an attack vectors segment, a coverage spread segment, and/or an identify and exploit segment. As used herein, an impact potential segment is a segment of a comprehensive security coverage framework including the potential impact of an exploitation of a security vulnerability of an application 344 being analyzed. The security vulnerability can be a hypothetical security vulnerability. For example, the application 344 can be analyzed relatively early (e.g., before deployment of the application 344, before a maintenance phase for the application 344, etc.) in the development process. Further, a potential and/or hypothetical security vulnerability can be identified based on a description of an application 344 and/or a description of a plan for the application 344. The potential and/or hypothetical security vulnerability can be identified in an early iteration of the application 344 and/or application plan, allowing for early correction and conservation of developing resources. That is identification of potential and/or hypothetical security vulnerabilities allowing for early risk mitigation measures can conserve resources that would otherwise be wasted in mitigating risk upon discovery in a completed product.

The impact potential segment can be addressed by a question of the type discussed above. As used herein, the question is provided via a computing device. The question can include a portion of a phrase. The portion of the phrase can include a designation of a risk element, a prompt to respond, and/or a query regarding a risk element. The security risk element can include a security metric that classifies and/or quantifies an element of an impact potential segment of a comprehensive security coverage framework.

The security risk element can include a confidentiality impact of a potential exploitation of the security vulnerability. As used herein a confidentiality impact of potential exploitation of the security vulnerability can include a type of data being processed, stored, and/or utilized by the application 344 and/or the negative potential of exploitation of a security vulnerability exposing that data to unpermitted entities. The question can therefore include a prompt to characterize a metric of the application 344 that is associated with the security risk element. For example, the question can include a prompt to characterize the type of data being processed, stored, and/or utilized by the application 344 and/or the negative potential of exploitation of a vulnerability exposing that data to unpermitted entities. The characterization can include a description selected from a set of descriptions each providing a portion of coverage of a range, scale, and/or continuum of possible classifications and/or quantification of security metrics the application 344 as it relates to a confidentiality impact of potential exploitation of the security vulnerability.

The set of descriptions can include a description describing the confidentiality impact of potential exploitation of the security vulnerability as "no," "low," "intermediate," and/or "high." A "no" confidentiality impact description can include where an application 344 does not process, store, or utilize any potentially damaging data (e.g., sensitive organizational data, sensitive customer data, internal system data, master encryption key, etc.). Additionally, a "no" confidentiality impact description can include where the impact is quantified (e.g., impact score, data sensitivity score, quantity of sensitive data, etc.) and the quantified impact is below a predetermine threshold value.

A "low" confidentiality impact can include where a potential exploitation of a security vulnerability of the application 344 exposes trivial and/or public information to unauthorized entities. For example, a "low" confidentiality impact can include where the application 344 processes, stores, and/or utilizes trivial and/or public information. Additionally a "low" confidentiality impact can include where the confidentiality impact of a potential exploitation of a security vulnerability of the application 344 is quantified (e.g., impact score, data sensitivity score, quantity of sensitive data, etc.) and the quantified confidentiality impact is between two predetermine threshold values.

An "intermediate" confidentiality impact can include where a potential exploitation of a security vulnerability of the application 344 exposes a portion of sensitive data and/or internal system data. For example, an "intermediate" confidentiality impact can include where the application 344 processes, stores, and/or utilizes sensitive data and/or internal system data, a portion of which can be exposed via exploitation of a security vulnerability. Additionally, An "intermediate" confidentiality impact can include where the confidentiality impact of a potential exploitation of a security vulnerability of the application 344 is quantified (e.g., impact score, data sensitivity score, quantity of sensitive data, etc.) and the quantified confidentiality impact is between two predetermine threshold values, where the lower threshold value is greater than the upper threshold value of the predetermined upper threshold value of the low confidentially impact.

A "high" confidentially impact can include where a potential exploitation of a security vulnerability of the application 344 exposes a portion of sensitive data exceeding a threshold and/or data comprising sensitive assets (e.g., sensitive organizational data, sensitive customer data, internal system data, master encryption key, etc.). Additionally, a "high" confidentially impact can include where the confidentiality impact of a potential exploitation of a security vulnerability of the application 344 is quantified (e.g., impact score, data sensitivity score, quantity of sensitive data, etc.) and the quantified confidentiality impact is above a predetermine threshold value.

Each description of the set of the descriptions can be scored by the score calculator 350. For example, the descriptions can be associated with a score that can be a number within a sequence of numbers comprising a scale. The scores can include, for example, the numbers 0, 1, 2, and 3. For example, the description describing the confidentiality impact of a potential exploitation of a security vulnerability as "no" impact can be associated with a score of 0. The description describing the confidentiality impact of a potential exploitation of a security vulnerability as "low" (e.g., potentially exposing trivial and/or public information, etc.) can be associated with a score of 1. The description describing the confidentiality impact of a potential exploitation of a security vulnerability as "intermediate" (e.g., potentially exposing a portion of sensitive data and/or internal system data, etc.) can be associated with a score of 2. The description describing the confidentiality impact of a potential exploitation of a security vulnerability "high" (e.g., potentially exposing a portion of sensitive data exceeding a threshold and/or data comprising sensitive assets, etc.) can be associated with a score of 3.

A selection of a scored description of the set of descriptions associated with the confidentiality impact can be received as an input and the score can be associated with the confidentiality impact security risk element. That is, the confidentiality impact security risk element can be scored according to the score associated with the selected description.

Additionally, the security risk element can include an integrity impact of a potential exploitation of a security vulnerability. As used herein, an integrity impact is a level of control ceded during exploitation of a security vulnerability and/or the potential damage to the data and/or integrity of an entity associated with the application 344 by an exploitation of the security vulnerability. The question associated with the integrity impact can include a question prompting a characterization of the level of control ceded during exploitation of a security vulnerability and/or the potential damage to the data and/or integrity of an entity associated with the application 344 by an exploitation of the security vulnerability. The characterization can include a description selected from a set of descriptions each providing a portion of coverage of a range, scale, and/or continuum of possible classifications and/or quantifications of security metrics of the application 344 as it relates to an integrity impact of a potential exploitation of the security vulnerability.

The set of descriptions can include a description describing the integrity impact of potential exploitation of the security vulnerability as "no," "low," "intermediate," and/or "high." A "no" integrity impact can include where there is not an opportunity for exploitation of the security vulnerability to result in unauthorized control of the application 344 and/or a resources of the application 344. Additionally, a "no" integrity impact can include where there is no chance that unauthorized control can damage the data and/or integrity of an entity associated with the application 344 (e.g., a business, organization, application developer, application provider, cloud services provider, etc.). A "no" integrity impact can include where the integrity impact of a potential exploitation of the security vulnerability of the application 344 is quantified (e.g., integrity damage score, confidence in product score, percentage of takeover possible, percentage of defacement possible, integrity value of assets that can be taken over, level of impersonation score, impersonation potential damage score, scored amount of damage to core business, scored amount of damage to data, etc.) and the quantified integrity impact is below a predetermined threshold value.

A "low" integrity impact can include where a potential exploitation of a security vulnerability of the application 344 exposes public information that can be spoofed by an unauthorized entity to masquerade as a customer and/or an organization (e.g., an business, a cloud services provider, an application developer, application provider, etc.) associated with the application 344 utilizing the public information. Additionally, a "low" integrity impact can include where a potential exploitation of a security vulnerability of the application 344 can cause minor damage (e.g., a contained data loss and/or data leak of relatively small amount of data including easily recoverable, non-critical, and/or publically available data) to a core business associated with the application 344 (e.g., a core business of the organization) and/or minor damage (e.g., a contained data loss and/or data leak of a relatively small amount of data including easily recoverable, non-critical, and/or non-personally identifiable information) to customers' data. Minor damage to a core business can include a quantified amount of damage below a predetermined damage threshold. Minor damage to customers' data can include a quantified amount of damage below a predetermined damage threshold. Additionally, the potential exploitation of an application 344 security vulnerability can be described as having a low integrity impact where the integrity impact is quantified (e.g., integrity damage score, confidence in product score, percentage of takeover possible, percentage of defacement possible, integrity value of assets that can be taken over, level of impersonation score, impersonation potential damage score, scored amount of damage to core business, scored amount of damage to data, etc.) and the quantified integrity impact is between two predetermine threshold values.

An "intermediate" integrity impact can include where a potential exploitation of a security vulnerability of the application 344 exposes a portion of sensitive data that can be utilized in a partial impersonation by an unauthorized entity of a customer and/or an organization (e.g., a business, a cloud provider, a software developer, etc.) associated with the application 344 by utilizing the portion of sensitive data. Additionally, an "intermediate" integrity impact can include where a potential exploitation of a security vulnerability of the application 344 exposes some of the application data to unauthorized modification and/or exposes customer data and/or the core business associated with the application 344 to an intermediate level of damage (e.g., a data loss and/or data leak of a relatively large amount of data including a relatively small amount of sensitive information, confidential information, and/or personally identifiable information). An intermediate level of damage to the core business and/or customer data can include a quantified amount of damage between two predetermined thresholds of damage quantities. Additionally, an "intermediate" integrity impact can include where the integrity impact of a potential exploitation of a security vulnerability is quantified (e.g., integrity damage score, confidence in product score, percentage of takeover possible, percentage of defacement possible, integrity value of assets that can be taken over, level of impersonation score, impersonation potential damage score, scored amount of damage to core business, scored amount of damage to data, etc.) and the quantified integrity impact is between two predetermined threshold values, where the lower threshold value is greater than the upper threshold value of the predetermined upper threshold value of the "low" integrity impact.

A "high" integrity impact can include where a potential exploitation of a security vulnerability of the application 344 exposes a relatively larger portion (than the "intermediate" integrity impact portion) of sensitive data that can be utilized in a full impersonation of a customer and/or a core business (e.g., a core business of an organization associated with providing the application 344) associated with the application 344. A "high" integrity impact can include where a potential exploitation of a security vulnerability of the application 344 exposes the application 344 and/or its related resources to persistent defacement. For example, a "high" integrity impact can include where a potential exploitation of a security vulnerability of the application 344 exposes a server associated with the application to takeover by unauthorized entities. A "high" integrity impact can also include where a potential exploitation of a security vulnerability of the application 344 causes major damage (e.g., a large and/or uncontained data loss and/or leak including a large portion of sensitive information, confidential information, and/or personally identifiable information) to a core business associated with the application 344 and/or customer data. Major damage can include a quantified amount of damage to a core business and/or customer data exceeding a predetermined threshold of damage.

Each description of the set of the descriptions can be scored by the score calculator 350. For example, the descriptions can be associated with a score that can be a number within a sequence of numbers comprising a scale. The scores can include, for example, the numbers 0, 1, 2, and 3. For example, the description describing the integrity impact of a potential exploitation of a security vulnerability as "no" impact can be associated with a score of 0. The description describing the integrity impact of a potential exploitation of a security vulnerability as "low" (e.g., potentially exposing public information that can be spoofed by an unauthorized entity to masquerade as a customer and/or a business associated with the application 344 based on the public information) can be associated with a score of 1. The description describing the integrity impact of a potential exploitation of a security vulnerability as "intermediate" (e.g., potentially exposing a portion of sensitive data that can be utilized in a partial impersonation by an unauthorized entity of a customer and/or a business associated with the application 344 based on the portion of sensitive data) can be associated with a score of 2. The description describing the integrity impact of a potential exploitation of a security vulnerability as "high" (e.g., potentially exposing a portion of sensitize data that can be utilized in a full impersonation of a customer and/or a business associated with the application 344) can be associated with a score of 3.

A selection of a scored description of the set of descriptions associated with the integrity impact can be received as an input and the score can be associated with the integrity impact security risk element. That is, the integrity impact security risk element can be scored according to the score associated with the selected description.

The security risk element can include an availability impact of a potential exploitation of the security vulnerability. As used herein, an availability impact includes an impact of a potential exploitation of a security vulnerability on the availability of the application 344. The question associated with the availability impact can include a question prompting a characterization of the impact of a potential exploitation of a security vulnerability on availability of the application 344, any data loss associated with that availability impact, and/or a business effect of the availability impact. The characterization can include a description selected from a set of descriptions each providing a portion of coverage of a range, scale, and/or continuum of possible classifications and/or quantifications of security metrics of the application 344 as it relates to an availability impact of a potential exploitation of a security vulnerability.

The set of descriptions can include a description describing the availability impact of potential exploitation of the security vulnerability as "no," "low," "intermediate," and/or "high." A "no" availability impact can include where there is not an inherent opportunity for a security vulnerability exploitation to affect the availability of the application 344, resources associated with the application 344, and/or associated critical services, etc.

A "low" availability impact can include where a potential exploitation of a security vulnerability of the application 344 exposes a relatively small amount (e.g., an amount of users below a predetermined threshold of users) to a denial of service (DoS) (e.g., rendering a machine, network resource, service, and/or application 344 unavailable to its intended users). The description can describe the duration of any potential DoS. For example, the duration can be described as a short time window and/or be described as a predicted quantity of time of a DoS that falls below a predetermined threshold. Further, the description can describe the availability impact of a potential exploitation of a security vulnerability as ultimately causing no business effect and/or a business effect falling below a predetermined threshold.

An "intermediate" availability impact can include where a potential exploitation of a security vulnerability exposes a limited group of users to a DoS. The limited group can be a specific subset of users. The limited group can be a quantity of users potentially subject to a DoS where the quantity is between two predetermined thresholds.

Additionally, the description can describe the duration of any potential DoS. For example, the duration can be described as a "limited" time window and/or be described as a predicted quantity of time of a DoS that falls between two predetermined thresholds.

The description can also describe the type and/or quantity of each type of each service that could be affected by a DoS caused by potential exploitation of the security vulnerability. For example, the type of affected services can be described as "limited" services and/or "non-critical" services. An alteration in the availability of a limited number of services can include an alteration in the availability of a portion of all the services associated with the application 344. The portion can be a quantity below a predetermined threshold and/or a predetermined category of services. A non-critical service can include a service that is not critical or a service of limited criticality to the function of the application 344. For example, a non-critical service can fault and/or fail to come online without causing an associated application 344 to fail.

Additionally, the description can describe a quantity of data loss associated with exploitation of the security vulnerability. The quantity of data loss can include a characterization of the data loss, such as a "partial" data loss (e.g., loss of a portion of the data). The characterization can be based on the quantity of data loss in relation to one or more predetermined thresholds.

A "high" availability impact can include where a potential exploitation of a security vulnerability exposes a large amount of users (e.g., an amount of users greater than a predetermined threshold) and/or all users of an application 344 to a denial of service (DoS).

The description can describe the duration of any potential DoS. For example, the duration can be described as a relatively "long" time window (e.g., a longer time window compared to services not experiencing a DoS, more than a day, a period of time that prevents a user from regular periodic use, etc.) and/or be described as a predicted quantity of time of a DoS that is greater than a predetermined threshold.

The description can also describe the type of services that could be affected by a DoS caused by exploiting the security vulnerability. For example, the type of services can be described as "critical" services. Critical service can include a service that is critical to the function of the application 344. For example, when a critical service faults and/or fails to come online a DoS for the entire application 344 can occur.

Additionally, the description can describe a quantity of data loss associated with exploitation of the security vulnerability. The quantity of data loss can include a characterization of the data loss, such as a "major" data loss (e.g., loss of a large portion of the data and/or loss of extremely sensitive data). The characterization can be based on the quantity of data loss in relation to one or more predetermined thresholds.

Each description of the set of the descriptions can be scored by the score calculator 350. For example, the descriptions can be associated with a score that can be a number within a sequence of numbers comprising a scale. The scores can include, for example, the numbers 0, 1, 2, and 3. For example, the description describing the availability impact of a potential exploitation of a security impact as having as "no" impact can be associated with a score of 0. The description describing the availability impact of a potential exploitation of a security impact as a "low" availability impact (e.g., potentially creating a short term DoS for a small amount of users, with no business affect) can be associated with a score of 1. The description describing the availability impact of a potential exploitation of a security vulnerability as an "intermediate" availability impact (e.g., potentially causing a DoS for a limited group of users for a limited time, with partial data loss) can be associated with a score of 2. The description describing the availability impact as a "high" availability impact (e.g., a potential exploitation of a security impact as potentially creating an application-wide DoS for a long time window for a large group of users resulting in major data loss) can be associated with a score of 3.

A selection of a scored description of the set of descriptions associated with the availability impact can be received as an input and the score can be associated with the availability impact security risk element. That is, the availability impact security risk element can be scored according to the score associated with the selected description.

As used herein, a reconstructing segment includes a segment of a comprehensive security coverage framework including the potential ability to reconstruct an exploitation of a security vulnerability of an application 344 being analyzed. The security vulnerability can be a hypothetical security vulnerability. For example, the application 344 can be analyzed early in the development process. Further, a potential and/or hypothetical security vulnerability can be identified based on a description of an application 344 and/or a description of a plan for the application 344. The potential and/or hypothetical security vulnerability can be identified in an early iteration of the application 344 and/or application planning, allowing for early correction and conservation of developing resources. As used herein, the reconstructing segment can be addressed by a question. As used herein, the question can be provided via a computing device. The question can include a portion of a phrase. The portion of the phrase can include a designation of a risk element, a prompt to respond, and/or a query regarding a risk element. The security risk element can include a security metric that classifies and/or quantifies an element of a reconstructing segment of a comprehensive security coverage framework.

The security risk element can include a reproducibility of an exploitation of the security vulnerability. As used herein a reproducibility includes the effort with which the security vulnerability can be repeatedly exploited. The question can therefore include a prompt to characterize a metric of the application 344 that is associated with the reproducibility security risk element. For example, the question can include a prompt to characterize a difficulty associated with reproducing a security vulnerability exploit. The characterization can include a description selected from a set of descriptions each providing a portion of coverage of a range, scale, and/or continuum of possible classifications and/or quantifications of a potential exploitation of the application 344 as it relates to a reproducibility of a security vulnerability and/or its exploitation.

The set of descriptions can include a description describing the reproducibility impact of potential exploitation of the security vulnerability as ""low," "intermediate," and/or "high." A "low" reproducibility impact can include where the reproducibility of a potential exploitation of a security vulnerability of an application 344 is relatively rare. For example, a "low" reproducibility impact can include where the exploitation of a security vulnerability of the application 344 is relatively difficult (e.g., technically sophisticated and extensive pre-conditions are required) to reproduce even when the security flaw is well known. For example, where a quantity and/or quality of preconditions to reproduce the security vulnerability exploit are above a predetermined threshold, the reproducibility may be described as rare.

An "intermediate" reproducibility impact can include where the reproducibility of a potential exploitation of a security vulnerability of an application 344 is relatively limited. A reproducibility of a security vulnerability exploitation for an application 344 can be described as limited where, for example, it involves an intermediate level of sophistication and preconditions to reproduce. For example, an "intermediate" reproducibility impact can include where the quantity of preconditions to reproduce the security vulnerability exploit is between two predetermined thresholds. Additionally, an "intermediate" reproducibility impact can include where the reproducibility of a potential exploitation of a security vulnerability of an application 344 the time window for reproducing the security vulnerability exploitation is limited and/or is a quantity of time below a predetermined threshold.

A "high" reproducibility impact can include where the reproducibility of a potential exploitation of a security vulnerability of an application 344 is relatively common. The reproducibility impact of a security vulnerability exploitation for an application 344 can be described as common where, for example, the quantity of preconditions to reproduce the security vulnerability exploit is above a predetermined threshold. Additionally, a "high" reproducibility impact can include where the time window for reproducing the security vulnerability exploitation is a quantity of time below a predetermined threshold.

Each description of the set of the descriptions can be scored by the score calculator 350. For example, the descriptions can be associated with a score that can be a number within a sequence of numbers comprising a scale. The scores can include, for example, the numbers 1, 2, and 3. For example, the description describing the reproducibility as "low" (e.g., the exploitation is very difficult to reproduce, reproducing the exploitation involves technically sophisticated and extensive pre-conditions, even when the security flaw is well known preconditions and extensive knowledge are involved in its exploit, a quantity and/or quality of preconditions to reproduce the security vulnerability exploit are below a predetermined threshold, etc.) can be associated with a score of 1. The description describing the reproducibility as "intermediate" (e.g., the exploit involves an intermediate level of sophistication and preconditions to reproduce, the quantity of preconditions to reproduce the security vulnerability exploit is between two predetermined thresholds, the time window for reproducing the security vulnerability exploitation is limited and/or is a quantity of time below a predetermined threshold, etc.) can be associated with a score of 2. The description describing the reproducibility as "high" (e.g., the quantity of preconditions to reproduce the security vulnerability exploit is below a predetermined threshold, the time window for reproducing the security vulnerability exploitation is a quantity of time above a predetermined threshold, etc.) can be associated with a score of 3.

A selection of a scored description of the set of descriptions associated with the reproducibility can be received as an input and the score can be associated with the reproducibility security risk element. That is, the reproducibility security risk element can be scored according to the score associated with the selected description.

As used herein, an attack vectors segment includes a segment of a comprehensive security coverage framework including the skills and vectors involved in exploiting the security vulnerability of the application 344 being analyzed. The security vulnerability can be a hypothetical security vulnerability. For example, the application 344 can be analyzed early in the development process. Further, a potential and/or hypothetical security vulnerability can be identified based on a description of an application 344 and/or a description of a plan for the application 344. The potential and/or hypothetical security vulnerability can be identified in an early iteration of the application 344 and/or application planning, allowing for early correction and conservation of developing resources.

As used herein, the attack vectors segment can be addressed by a question. As used herein, the question can be provided via a computing device. The question can include a portion of a phrase. The portion of the phrase can include a designation of a risk element, a prompt to respond, and/or a query regarding a risk element. The security risk element can include a security metric that classifies and/or quantifies an element of an attack vectors segment of a comprehensive security coverage framework.

The security risk element can include attack skills associated with exploiting the security vulnerability. As used herein, attack skills can include the skills and or utilities involved in exploiting the security vulnerability. The question can therefore include a prompt to characterize a metric of the application 344 that classifies and/or quantifies the security risk element. For example, the question can include a prompt to characterize the level of skill/knowledge involved in exploiting the security vulnerability, the amount of time involved in exploiting the security vulnerability, and the utilities involved in exploiting the security vulnerability. The characterization can include a description selected from a set of descriptions each providing a portion of coverage of a range, scale, and/or continuum of possible classifications and/or quantifications of the application 344 as it relates to attack skills associated with exploiting the security vulnerability.

The set of descriptions can include a description describing the attack skills involved in a potential exploitation of the security vulnerability as ""low," "intermediate," and/or "high." A "high" attack skill can include where the acquisition and implementation of the skills involved in exploiting a security vulnerability of the application 344 are relatively difficult. For example, where high level programming and/or hacking skills, internal knowledge of the application 344, and/or a large quantity of time is involved in exploiting the security vulnerability. A "high" attack skill can include where the programming and/or hacking skills, internal knowledge of the application 344, and/or a quantity of time involved in exploiting the security vulnerability exceeds a predetermined threshold.

An "intermediate" attack skill can include where the acquisition and implementation of the skills involved in exploiting a security vulnerability of the application 344 are of relatively intermediate difficulty. For example, where an intermediate level of programming and/or hacking skills are utilized in exploiting the security vulnerability, preparing the exploit takes a few hours to a few days, and/or once exploited an exploit can be repeated with minimal additional effort. An "intermediate" attack skill can include where the programming and/or hacking skills, exploit preparation time, and/or an amount of effort to repeat the exploitation of the security vulnerability are between two predetermined thresholds.

A "low" attack skill can include where the acquisition and implementation of the skills involved in exploiting a security vulnerability of the application 344 are relatively easy. For example, where minimal special programming and/or hacking skills are utilized in exploiting the security vulnerability, the security vulnerability can be exploited using commonly available exploiting tools, the security vulnerability can be exploited reusing commonly available public exploits, and/ or preparing the exploit takes a small quantity of time. A "low" attack skill can include where the programming and/or hacking skills and/or exploit preparation time are below predetermined threshold.

Each description of the set of the descriptions can be scored by the score calculator 350. For example, the descriptions can be associated with a score that can be a number within a sequence of numbers comprising a scale. The scores can include, for example, the numbers 1, 2, and 3. For example, the description describing the attack skills as "high" (e.g., high level programming and/or hacking skills, internal knowledge of the application 344, and/or a large quantity of time is involved in exploiting the security vulnerability, the programming and/or hacking skills, internal knowledge of the application 344, and/or a quantity of time involved in exploiting the security vulnerability exceeds a predetermined threshold) can be associated with a score of 1. The description describing the attack skills as "intermediate" (e.g., an intermediate level of programming and/or hacking skills are utilized in exploiting the security vulnerability, preparing the exploit takes a few hours to a few days, once exploited an exploit can be repeated with minimal additional effort, the programming and/or hacking skills, exploit preparation time, and/or an amount of effort to repeat the exploitation of the security vulnerability are between two predetermined thresholds) can be associated with a score of 2. The description describing the attack skills as "low" (e.g., minimal special programming and/or hacking skills are utilized in exploiting the security vulnerability, the security vulnerability can be exploited using commonly available exploiting tools, the security vulnerability can be exploited reusing commonly available public exploits, preparing the exploit takes a small quantity of time, the programming and/or hacking skills and/or exploit preparation time are below predetermined threshold, etc.) can be associated with a score of 3.

A selection of a scored description of the set of descriptions associated with the attack skills can be received as an input and the score can be associated with the attack skills security risk element. That is, the attack skills security risk element can be scored according to the score associated with the selected description.

The security risk element can include access vectors associated with exploiting the security vulnerability. As used herein, access vectors include the type of access involved in exploiting the security vulnerability. The question can therefore include a prompt to characterize a metric classifying and/or quantifying the security risk element of the application 344. For example, the question can include a prompt to characterize the type of access to a system associated with the application 344 involved in exploiting the security vulnerability. The characterization can include a description selected from a set of descriptions each providing a portion of coverage of a range, scale, and/or continuum of possible classifications of the application 344 as it relates to access vectors associated with exploiting the security vulnerability.

The set of descriptions can include a description describing the access vectors involved in a potential exploitation of the security vulnerability as ""low," "intermediate," and/or "high." A "low" access vector can include where access to the application 344 is restricted to limited and/or secure internal access. For example, a "low" access vector can include where an exploiting entity utilizes physical access to the system having the security vulnerability and/or a local account (e.g., having identity verification and/or authorization control measures in place) with the system having the security vulnerability to affect the exploit.

An "intermediate" access vector can include where access to the application 344 is available through internal access. An "intermediate" access vector can include where, for example, an exploiting entity utilizes physical access to the system having the security vulnerability without any identity verification and/or authorization control measures in place and/or an adjacent network (e.g., accessing a broadcast or collision domain of the system having the security vulnerability).

A "high" access vector can include where access to the application 344 is available through external access. External access can include where, for example, an exploiting entity is able to remotely exploit the security vulnerability utilizing a separate network and/or a network layer above the layer that includes the security vulnerability.

Each description of the set of the descriptions can be scored by the score calculator 350. For example, the descriptions can be associated with a score that can be a number within a sequence of numbers comprising a scale. The scores can include, for example, the numbers 1, 2, and 3. For example, the description describing the access vectors as "low" (e.g., an exploiting entity utilizes physical access to the system having the security vulnerability, an exploiting entity utilizes a local account having identity verification and/or authorization control measures in place, etc.) can be associated with a score of 1. The description describing the access vectors as "intermediate" (e.g., an exploiting entity utilizes physical access to the system having the security vulnerability without any identity verification and/or authorization control measures in place, an exploiting entity utilizes an adjacent network, an exploiting entity utilizes access to a broadcast or collision domain of the system having the security vulnerability to gain access for the exploit, etc.) can be associated with a score of 2. The description describing the access vectors as "high" (e.g., an exploiting entity is able to remotely exploit the security vulnerability utilizing a separate network and/or a network layer above the layer including the security vulnerability, etc.) can be associated with a score of 3.

A selection of a scored description of the set of descriptions associated with the access vectors can be received as an input and the score can be associated with the access vectors security risk element. That is, the access vectors security risk element can be scored according to the score associated with the selected description.

As used herein, a coverage spread segment includes a segment of a comprehensive security coverage framework including the affected users and/or tenants of a potential exploit of a security vulnerability of the application 344 being analyzed. The security vulnerability can be a hypothetical security vulnerability. For example, the application 344 can be analyzed early in the development process. Further, a potential and/or hypothetical security vulnerability can be identified based on a description of an application 344 and/or a description of a plan for the application 344. The potential and/or hypothetical security vulnerability can be identified in an early iteration of the application 344 and/or application planning, allowing for early correction and conservation of developing resources.

As used herein, the coverage spread segment can be addressed by a question. As used herein, the question can be provided via a computing device. The question can include a portion of a phrase. The portion of the phrase can include a designation of a risk element, a prompt to respond, and/or a query regarding a risk element. The security risk element can include a security metric that classifies and/or quantifies an security risk element of a coverage spread segment of a comprehensive security coverage framework.

The security risk element can include affected tenants of a security vulnerability exploitation. As used herein, affected tenants includes tenants of the application 344 and/or a system associated with the application 344 that are adversely affected (e.g., DoS, loss of access to the application 344, loss of tenant data, compromised sensitive information of the tenant, etc.) by exploitation of the security vulnerability. The question can therefore include a prompt to characterize a metric of the application 344 that is associated with the security risk element. For example, the question can include a prompt to characterize the tenants affected by exploitation of the security vulnerability. The characterization can include a description selected from a set of descriptions each providing a portion of coverage of a range, scale, and/or continuum of possible classifications and/or quantifications of the application 344 as it relates to tenants affected by exploiting the security vulnerability.

The set of descriptions can include a description describing the affected tenants of a potential exploitation of the security vulnerability as "none," "low," "intermediate," and/or "high." Affected tenants can be described as "none" where, for example, exploitation of the security vulnerability does not affect a tenant. For example, affected tenants can be described as "none" where the application 344 is a non-software as a service product and/or is utilized by users and not tenants.

Affected tenants can be described as "low" where, for example, a single tenant and/or a quantity and/or percentage of affected tenants resulting from exploitation of the security vulnerability is below a predetermined threshold of affected tenants.

Affected tenants can be described as "intermediate" where, for example, a quantity and/or percentage of affected tenants resulting from exploitation of the security vulnerability is between two predetermined thresholds of affected tenants.

Affected tenants can be described as "high" where, for example, a quantity and/or percentage of affected tenants resulting from exploitation of the security vulnerability exceeds a predetermined threshold of affected tenants.

Each description of the set of the descriptions can be scored by the score calculator 350. For example, the descriptions can be associated with a score that can be a number within a sequence of numbers comprising a scale. The scores can include, for example, the numbers 0, 1, 2, and 3. For example, the description describing the affected tenants as "none" (e.g., exploitation of the security vulnerability does not affect a tenant, the application 344 is a non-software as a service product, etc.) can be associated with a score of 0. For example, the description describing the affected tenants as "low" (e.g., a single tenant is affected by exploit of the security vulnerability, a quantity or percentage of affected tenants resulting from exploitation of the security vulnerability is below a predetermined threshold of affected tenants, etc.) can be associated with a score of 1. The description describing the affected tenants as "intermediate" (e.g., a quantity and/or percentage of affected tenants resulting from exploitation of the security vulnerability is between two predetermined thresholds of affected tenants, etc.) can be associated with a score of 2. The description describing the tenants as "high" (e.g., a quantity and/or percentage of affected tenants resulting from exploitation of the security vulnerability exceeds a predetermined threshold of affected tenants, etc.) can be associated with a score of 3.

A selection of a scored description of the set of descriptions associated with the affected tenants can be received as an input and the score can be associated with the affected tenants security risk element. That is, the affected tenants security risk element can be scored according to the score associated with the selected description.

The security risk element can include users affected by a security vulnerability exploitation. As used herein, affected users includes users of the application 344 and/or a system associated with the application 344 that are adversely affected (e.g., DoS, loss of access to the application 344, loss of user data, compromised sensitive information of the users, etc.) by exploitation of the security vulnerability. The question can therefore include a prompt to characterize a metric of the application 344 that is associated with the security risk element. For example, the question can include a prompt to characterize the users affected by exploitation of the security vulnerability. The characterization can include a description selected from a set of descriptions each providing a portion of coverage of a range, scale, and/or continuum of possible classifications and/or quantifications of the application 344 as it relates to affected users from exploiting the security vulnerability.

The set of descriptions can include a description describing the affected users of a potential exploitation of the security vulnerability as "low," "intermediate," and/or "high." Affected users can be described as "low" where a potential exploitation of the security vulnerability of the application 344 affects a relatively a small group of users. For example, affected users can be described as "low" where a potential exploitation of the security vulnerability of the application 344 affects a quantity and/or percentage of users that is below a predetermined threshold of affected users (e.g., below ten percent of users).

Affected users can be described as "intermediate" where a potential exploitation of the security vulnerability of the application 344 affects a quantity and/or percentage of users that is between two predetermined thresholds of affected users (e.g., from ten percent to forty percent).

Affected users can be described as "high" where a potential exploitation of the security vulnerability of the application 344 affects a quantity and/or percentage of users exceeds a predetermined threshold of affected users (e.g., over forty percent).

Each description of the set of the descriptions can be scored by the score calculator 350. For example, the descriptions can be associated with a score that can be a number within a sequence of numbers comprising a scale. The scores can include, for example, the numbers 1, 2, and 3. For example, the description describing the affected users as a "low" (e.g., a relatively small group, a quantity and/or percentage of affected users resulting from exploitation of the security vulnerability is below a predetermined threshold of affected users, etc.) can be associated with a score of 1. The description describing the affected users as an "intermediate" (e.g., a relatively intermediately sized group, a quantity and/or percentage of affected users resulting from exploitation of the security vulnerability is between two predetermined thresholds of affected users, etc.) can be associated with a score of 2. The description describing the affected users as "high" (e.g., a relatively large group, a quantity and/or percentage of affected users resulting from exploitation of the security vulnerability exceeds a predetermined threshold of affected users, etc.) can be associated with a score of 3.

A selection of a scored description of the set of descriptions associated with the affected users can be received as inputs and the score can be associated with the affected users security risk element. That is, the affected users security risk element can be scored according to the score associated with the selected description.

As used herein, an identify and exploit segment includes a segment of a comprehensive security coverage framework including the skills and application surfaces involved in exploitation of the security vulnerability of the application 344. The security vulnerability can be a hypothetical security vulnerability. For example, the application 344 can be analyzed early in the development process. Further, a potential and/or hypothetical security vulnerability can be identified based on a description of an application 344 and/or a description of a plan for the application 344. The potential and/or hypothetical security vulnerability can be identified in an early iteration of the application 344 and/or application planning, allowing for early correction and conservation of developing resources.

As used herein, the identify and exploit segment is be addressed by a question. As used herein, the question is provided via a computing device. The question can include a portion of a phrase. The portion of the phrase can include a designation of a risk element, a prompt to respond, and/or a query regarding a risk element. The security risk element can include a security metric that classifies and/or quantifies a security risk element of coverage spread segment of a comprehensive security coverage framework.

The security risk element can include skills involved in identification of a security vulnerability and/or its exploitation. As used herein, skills involved in identification of a security vulnerability and/or its exploitation includes skills, knowledge, utilities and/or efforts involved in identification of a security vulnerability and/or its exploitation. The question can therefore include a prompt to characterize a metric of the application 344 that is associated with the security risk element. For example, the question can include a prompt to characterize the skills, knowledge, utilities and/or efforts involved in identification of a security vulnerability and/or its exploitation.

The set of descriptions can include a description describing the identification/exploitation skills as ""low," "intermediate," and/or "high." A "high" identification/exploitation skills can include where the skills involved to identify and exploit the security vulnerability of the application 344 are relatively uncommon (e.g., not present in the majority of the population, can only be acquired through specialized training and/or courses, are only possessed by a quantity of a population below a predetermined threshold, etc.). For example, A "high" identification/exploitation skills can include where the identification and exploitation of the security vulnerability of the application 344 involves a high level of manual effort (e.g., a quantity of processing resources and/or time investment to identify the security vulnerability and/or exploit that exceeds a predetermined threshold).

An "intermediate" identification/exploitation skills can include where the skills involved to identify and exploit the security vulnerability of the application 344 are relatively commonly known and available, but a modicum of manual effort is involved in identification of the security vulnerability and/or its exploitation (e.g., a quantity of processing resources and/or time investment to identify the security vulnerability and/or exploit that is between two predetermined thresholds).

A "high" identification/exploitation skills can include where the skills involved to identify and exploit the security vulnerability of the application 344 are very common (e.g., where identifying the security vulnerability and/or its exploitation can be accomplished utilizing publically available well-documented information and/or automatically by utilizing easy to use and/or free utilities). A "high" identification/exploitation skills can include where identification and exploit of the security vulnerability of the application 344 involves skills, knowledge, utilities and/or quantities of time below a predefined threshold.

Each description of the set of the descriptions can be scored by the score calculator 350. For example, the descriptions can be associated with a score that can be a number within a sequence of numbers comprising a scale. The scores can include, for example, the numbers 1, 2, and 3. For example, the description describing the skills as "high" (e.g., exploitation of the security vulnerability involves skills and knowledge that are uncommon, identification of the security vulnerability and/or its exploitation involves a high level of manual effort, etc.) can be associated with a score of 1. The description describing the skills as "intermediate" (e.g., the skills, knowledge, and/or utilities involved in the identification of the security vulnerability and/or its exploitation are commonly known and available, but a modicum of manual effort is involved in identification of the security vulnerability and/or its exploitation, a quantity of processing resources and/or time investment to identify the security vulnerability and/or exploit that is between two predetermined thresholds is involved in exploiting the security vulnerability, etc.) can be associated with a score of 2. The description describing the skills as "low" (e.g., e.g., exploitation can be accomplished utilizing publically available well-documented information, exploitation can be accomplished utilizing easy to use and/or free utilities, identifying the security vulnerability and/or its exploitation involves skills, knowledge, utilities and/or quantities of time below a predefined threshold, etc.) can be associated with a score of 3.

A selection of a scored description of the set of descriptions associated with the skills involved in identification of a security vulnerability and/or its exploitation can be received as an input and the score can be associated with the skills security risk element. That is, the skills security risk element can be scored according to the score associated with the selected description.

The security risk element can include an attack surface of an application 344 associated with exploitation of a security vulnerability of the application 344. As used herein, an attack surface of an application 344 includes the sum of different vulnerable surfaces (e.g., entry point, input fields, protocols, interfaces, services, etc.) of the application 344 where an unauthorized entity can exploit a security vulnerability. The question can therefore include a prompt to characterize a metric of the application 344 that is associated with the security risk element. For example, the question can include a prompt to characterize the attack surface of the application 344.

The characterization can include a description selected from a set of descriptions each providing a portion of coverage of a range, scale, and/or continuum of possible classifications and/or quantifications of the application 344 as it relates to the attack surface of the application 344.

The set of descriptions can include a description describing the attack surface of the application 344 as ""low," "intermediate," and/or "high." A "high" attack surface can include where vulnerable surfaces of an application 344 are highly protected (e.g., only accessible upon identity verification, is protected access control measures, and/or includes a strict security protocol) and/or are a portion of an obscure functionality of the application 344. Additionally, a "high" attack surface can include where a quantified amount of protection of vulnerable surfaces of an application 344 exceeds a predetermined threshold of protection.

An "intermediate" attack surface can include where vulnerable surfaces of an application 344 include some protective measures such as the potential attack surfaces being accessible through a protected interface limiting users and/or access to the attack surface depending on licensing arrangements and configuration of the application 344. Additionally, an "intermediate" attack surface can include where a quantified amount of protection of vulnerable surfaces of an application 344 is between two predetermined thresholds of protection.

A "low" attack surface can include where vulnerable surfaces of an application 344 are public. A "low" attack surface can include where vulnerable surfaces of an application 344 are accessible through publically accessible surfaces of the application 344, through surfaces of the application 344 found in a portion of features of the application 344 exceeding a predetermined threshold, and/or through a surface of the application 344 that can be identified by a quantity of users exceeding a predetermined threshold.

Each description of the set of the descriptions can be scored by the score calculator 350. For example, the descriptions can be associated with a score that can be a number within a sequence of numbers comprising a scale. The scores can include, for example, the numbers 1, 2, and 3. For example, the description describing the attack surface as "high" (e.g., the attack surface is only accessible upon identity verification, the attack surface is protected access control measures, the attack surface includes a strict security protocol, the attack surface is a portion of an obscure functionality of the application 344, the attack surface includes a quantified amount of protection that exceeds a predetermined threshold of protection) can be associated with a score of 1. The description describing the attack surface as "intermediate" (e.g., the attack surface is accessible through a protected interface limiting users and/or access to the attack surface, access to the attack surface depends on licensing arrangements and configuration of the application 344, the attack surface includes a quantified amount of protection that is between two predetermined thresholds of protection, etc.) can be associated with a score of 2. The description describing the attack surface as "low" (e.g., the attack surface is accessible through publically accessible surfaces of the application 344, the attack surface is accessible through surfaces of the application 344 found in a portion of features of the application 344 exceeding a predetermined threshold, the attack surface is accessible through a surface of the application 344 that can be identified by a quantity of users exceeding a predetermined threshold, etc.) can be associated with a score of 3.

A selection of a scored description of the set of descriptions associated with the attack surface can be received as an input and the score can be associated with the attack surface security risk element. That is, the attack surface security risk element can be scored according to the score associated with the selected description.

The score associated with each of the descriptions associated with the confidentiality impact, the integrity impact, the availability impact, the attack skills, the access vector, the affected tenants, affected users, identification and exploitation skills, and/or attack surface security risk elements can be modifiable by a user device and/or an organization associated with the application 344 to reflect a maturing tolerance for risk.

Each segment (e.g., impact potential segment, reconstructing segment, attack vectors segment, coverage spread segment, identify and exploit segment, etc.) can be associated with a score. For example, the score calculator 350 can calculate and/or assign a score for each segment based on the scored security risk elements associated with the respective segments.

The impact potential segment can be scored based on the confidentiality impact security risk element score, the integrity impact security risk element score, and the availability impact risk element score. The confidentiality impact security risk element score, the integrity impact security risk element score, and the availability impact risk element score can be analyzed and/or compared to calculate an impact potential segment score. For example, the confidentiality impact security risk element score, the integrity impact security risk element score, and the availability impact risk element score can be compared and the maximum score of the three scores can be designated the impact potential segment score. For example, if the confidentiality impact security risk element score is 2, the integrity impact security risk element score is 0, and the availability impact risk element score is 3, then 3 can be designated the impact potential segment score.

The reconstructing segment can be scored based on the reproducibility security risk element score. The reproducibility security risk element score can be analyzed to calculate a reconstructing segment score. For example, the reproducibility security risk element score, between 1-3, can be designated the reconstructing segment score.

The attack vectors segment can be scored based on the attack skills security risk element score and the access vectors security risk element score. The attack skills security risk element score and the access vectors security risk element score can be analyzed and/or compared to calculate an attack vectors segment score. For example, the arithmetic mean of the attack skills security risk element score and the access vectors security risk element score can be calculated and rounded up to the nearest integer, which can be designated as the attack vectors segment score. For example, if the attack skills security risk element score is 3 and the access vectors security risk element score is 2, an arithmetic mean of the scores, 2.5, can be rounded up to the nearest integer, in this example 3. Accordingly, the attack vectors segment score can be designated as 3.

The coverage spread segment can be scored based on the affected tenants security risk element score and the affected users security risk element score. The affected tenants security risk element score and the affected users security risk element score can be analyzed and/or compared to calculate an attack vectors segment score. For example, if the application 344 is a multi-tenancy software application (e.g., where a single instance of the software application runs on a server serving multiple client-organizations, etc.), then the affected tenants security risk element score and the affected users security risk element score can be compared and the maximum score of the two scores can be designated the coverage spread segment score. For example, if the affected tenants security risk element score is 1 and the affected users security risk element score is 2, then 2 can be designated the coverage spread segment score. If the application 344 is a non-multi-tenancy software application (e.g., multi-instance software product where separate software instances and/or hardware systems operate on behalf of different client-organizations, etc.), then the affected users security risk element score can be designated the coverage spread segment score.

The identify and exploit segment can be scored based on the identify and exploit skills security risk element score and the attack surface security risk element score. The skills security risk element score and the attack surface security risk element score can be analyzed and/or compared to calculate an identify and exploit segment score. For example, the arithmetic mean of the skills security risk element score and the attack surface security risk element score can be calculated and rounded up to the nearest integer, which can be designated as the identify and exploit segment score. For example, if the skills security risk element score is 3 and the attack surface security risk element score is 2, an arithmetic mean of the scores, 2.5, can be rounded up to the nearest integer, in this example 3. Accordingly, the identify and exploit segment score can be designated as 3.

As discussed earlier, the risk assessment framework can include a composite risk index including an impact component representing an impact of a risk event and a likelihood component including a probability of a risk event occurrence. The impact component and likelihood component can also be scored by the score calculator 350 based on the aforementioned scored segments. For example, the impact component can be scored based on the impact potential segment score and the identify and exploit segment score. The impact component score can be a sum of a weighted impact potential segment score and a weighted identify and exploit segment score. For example, the impact component can be a sum of the impact potential segment score with a seventy percent weighting and the identify and exploit segment score with a thirty percent weighting.

Additionally, the likelihood component can be scored based on the reconstructing segment score, the attack vectors segment score, and the coverage spread segment score. For example, the likelihood component score can be an arithmetic mean of the reconstructing segment score, the attack vectors segment score, and the coverage spread segment score.

The score calculator 350 can calculate a total risk score for the application 344. The total risk score for the application 344 can be based on the impact component score and/or the likelihood component score. For example, the total risk score can be based on the product of multiplying the impact component score and the likelihood component score. The total risk score can, for example, be the sum of the product of multiplying the impact component score by the likelihood component score and the number 1. In such examples, the total risk score is a number between 2 and 10.

The risk score characterizer 352 can characterize a total risk score associated with the security vulnerabilities of the application 344 based on where the total risk score falls within a predetermined characterization scale. The predetermined characterization scale can include a characterization associated with a portion of possible total risk scores. The predetermined characterization scale can be modified by a user device. For example, the portions of a possible total risk scores corresponding to a particular characterization can be modified as the application 344 and/or associated entity's risk tolerance matures.

The predetermined characterization scale can include threshold total risk score values corresponding to a risk characterization. For example, a total risk score from 2 to 4.9 can correspond to a "low" risk characterization n (e.g., where lower total risk scores correspond to lower total risk), a total risk score of 5 to 7 can correspond to a "medium" risk characterization, a total risk score of 7.1 to 8.5 can correspond to a "high" risk characterization, and a total risk score of 8.6 to 10 can correspond to a "critical" risk characterization. The characterization can also be modified by a user device to reflect the needs and tolerances of a user.

The display generator 354 can generate a display to display scores associated with the security vulnerabilities of the application 344. For example, the display generator 354 can generate a report and/or graphical representation containing the risk characterization, the underlying total risk score, the underlying risk element scores, and/or the underlying descriptions of risk element metrics to be output to the development environment 342, displayed on a user device, printed, saved to a database 356, and/or exported to complete further calculations.

The risk score manager 346, the score calculator 350, the characterizer 352, and/or the display generator 354 can access and/or include a database 356. The risk score manager 346, the score calculator 350, the characterizer 352, and/or the display generator 354 can access a database 356 to store scores associated with the security vulnerabilities of the application 344 as historical data points (e.g., historical risk characterizations). The risk score manager 346, the score calculator 350, the characterizer 352, and/or the display generator 354 can access a database 356 to retrieve historical data points. For example, the display generator 354 can retrieve historical data points from a database 356 for use in comparison of security vulnerabilities of the application 344 and/or measuring the efficacy of a risk reduction plan for the application 344.

Figure 4:
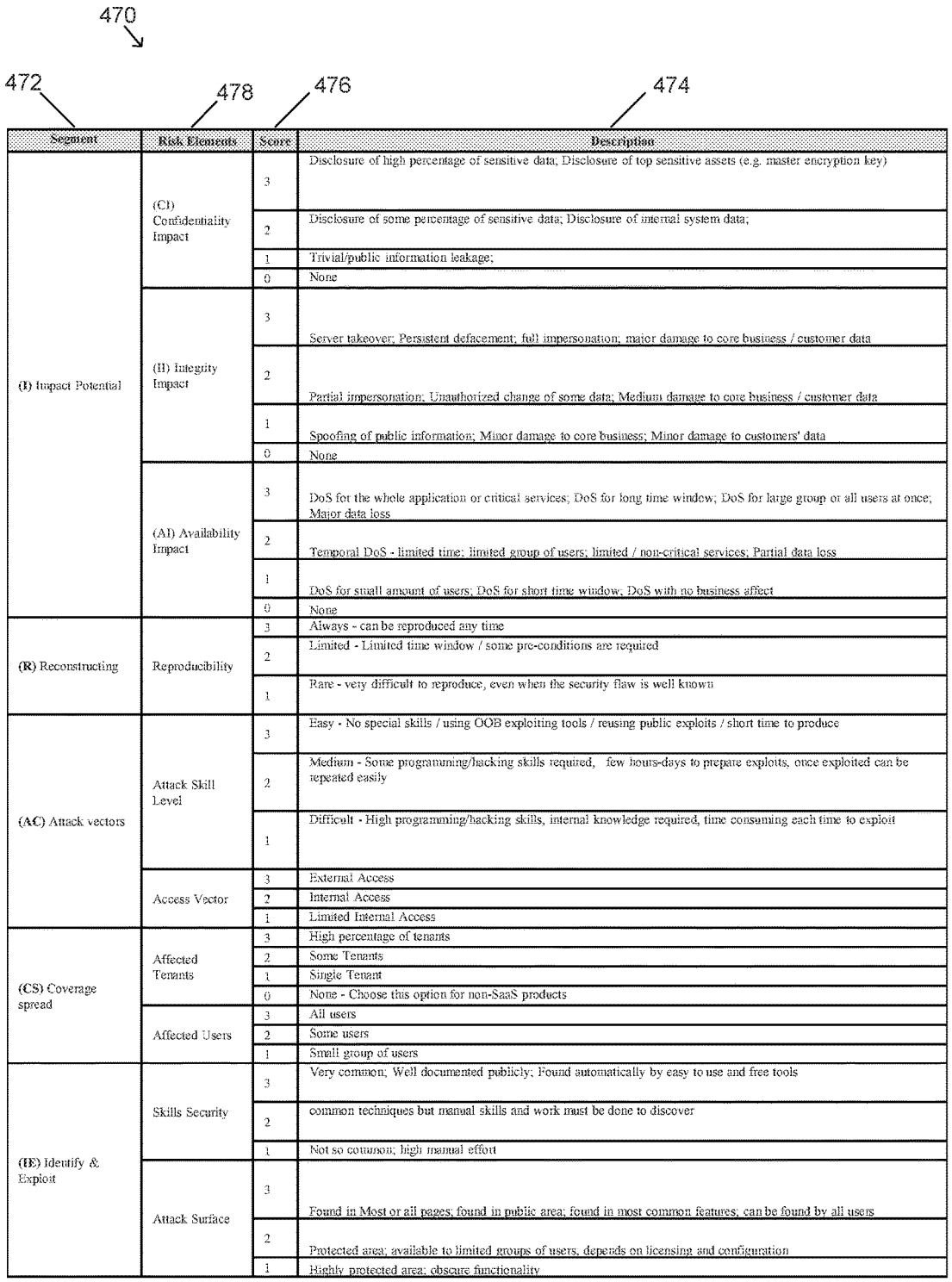
FIG. 4 illustrates an example comprehensive security coverage framework for risk scoring of a software application according to the present disclosure.

FIG. 4 illustrates an example comprehensive security coverage framework 470 for risk scoring of a software application according to the present disclosure. In some embodiments, the comprehensive security coverage framework 470 can be utilized by a system (e.g., system 100 as referenced in FIG. 1) and/or a computing device (e.g., computing device 220 as referenced in FIG. 2).

As used herein, a comprehensive security coverage framework 470 for risk scoring of a software application includes a plurality of segments 472 that represent components of a composite risk index including an impact component representing an impact of a risk event (e.g., exploitation of a security vulnerability) and a likelihood component including a probability of a risk event (e.g., exploitation of a security vulnerability) occurrence. The plurality of segments 472 can include an impact potential segment, a reconstructing segment, and attack vectors segment, a coverage spread segment, and an identify and exploit segment.

The plurality of segments 472 can be scored based on a plurality of corresponding scored descriptions 474 of security risk metrics selected in response to questions addressing security risk elements 478 of the segments 472 of a comprehensive security coverage framework 470. The security risk elements 478 can include a security metric that classifies and/or quantifies an element of a segment 472 of a comprehensive security coverage framework 470. For example, the security risk elements 478 can include a confidentiality impact risk element, an integrity impact risk element, an availability impact risk element, a reproducibility risk element, an attack skill level risk element, an access vector risk element, an affected tenants risk element, an affected users risk element, a skills security risk element, and/or an attack surface risk element.

Each of the plurality of descriptions 474 can include a characterization of a security risk element 478 metric corresponding to a particular segment of the plurality of segments 472. Each of the plurality of descriptions 474 can be associated with a score 476. The scores 476 can be a number within a sequence of numbers comprising a scale. The scores 476 can include, for example, the numbers 0, 1, 2, and/or 3. The scores 476 associated with each of the plurality of descriptions 474 can be modified as can the descriptions 474 themselves.

Figure 5:
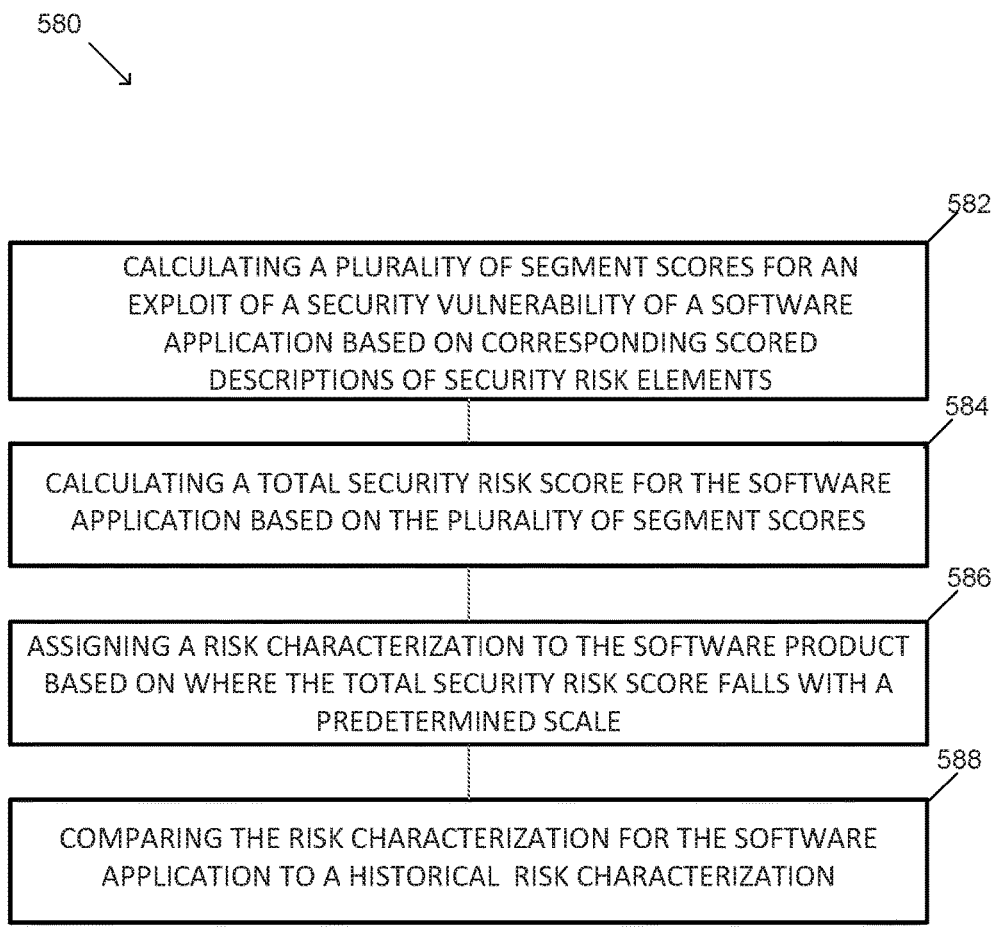
FIG. 5 illustrates a flow chart of an example method for risk scoring of a software application according to the present disclosure.

FIG. 5 is a flow chart of an example method 580 for evaluating software application security vulnerabilities throughout development according to the present disclosure. The method 580 can score and characterize the security vulnerabilities based on inputs generated throughout the development and release of a software application. The method 580 can characterize the security vulnerabilities based on the scores and the characterizations can be used to implement and/or measure the efficacy of a risk reduction plan for the software application by comparing the scores and/or the characterizations to historical risk characterizations. In some embodiments, the method 580 can be performed utilizing a system (e.g., system 100 as referenced in FIG. 1) and/or a computing device (e.g., computing device 220 as referenced in FIG. 2).

At box 582 the method 580 can include calculating a plurality of segment scores for an exploit of a security vulnerability of a software application based on corresponding scored descriptions of security risk elements. For example, this can include scoring an impact potential segment score, a reconstructing segment score, an attack vectors segment score, a coverage spread segment score, and an identify and exploit segment score for an exploit of a security vulnerability of a software application based on corresponding scored descriptions of security risk elements. The scored descriptions of security risk elements can include selections from a plurality of scored description options, each scored description characterizing a security metric associated with a security risk element. For example, scoring the impact potential segment score can include identifying as the impact potential segment score a greatest score associated with a portion of the scored descriptions describing a confidentiality impact security risk element, an integrity impact security risk element, and an availability impact security risk element. In another example, scoring the identify and exploit segment score can include calculating an arithmetic mean of scores associated with a portion of the scored descriptions describing an attack skill level risk element and an access vector risk element.

At box 584 the method 580 can include calculating a total security risk score for the software application based on the plurality of segment scores. For example, this can include calculating a total security risk score for the software application based impact potential segment score, the reconstructing segment score, the attack vectors segment score, the coverage spread segment score, and the identify and exploit segment score. For example, total risk score can be a sum of a weighted impact potential segment score and a weighted identify and exploit segment score (e.g., impact potential segment score with a 70% weighting and the identify and exploit segment score with a 30% weighting) multiplied by the arithmetic mean of the reconstructing segment score, the attack vectors segment score, and the coverage spread segment score. The total risk score can also include the sum of the product of the aforementioned multiplication and 1. In such examples, the total risk score is a number between 2 and 10.

At box 586 the method 580 can include assigning a risk characterization to the software product based on where the total security risk score falls with a predetermined scale. For example, a total risk score from 2 to 4.9 can correspond to a low risk categorization (e.g., where lower total risk scores correspond to lower total risk), a total risk score of 5 to 7 can correspond to a medium risk categorization, a total risk score of 7.1 to 8.5 can correspond to a high risk categorization, and a total risk score of 8.6 to 10 can correspond to a critical risk categorization. The categorization can also be modified by a user device to reflect a maturing risk tolerance.

At box 588 the method can include comparing the risk characterization for the software application to a historical risk characterization. The historical risk characterization can, for example, be from the same software application and/or from a separate software application in a multi-software application environment (e.g., a cloud service provider environment). The historical risk characterization can serve as a benchmark (e.g., a historical risk categorization of a software product that serves as a standard by which software applications are judged). The comparison can include flagging the risk characterization where it deviated from the benchmark historical risk characterization. The comparison can also include generating projections and/or recommended risk mitigation measures for the software application based on the historical risk categorization and/or the software application associated with the historical risk categorization. For example, if the software application of the historical risk categorization had particular risk mitigation measures associated with it, the same measures can be included as a recommended risk mitigation measure for the software application undergoing assessment in order to improve the risk characterization to a level in line with the historical risk characterization.

Additionally, comparing the risk characterization for the software application to a historical risk characterization can include tracking the risk characterization of the same software application. This can include measuring the efficacy of risk reduction measures and/or other modifications to the software application during development. Comparing can including flagging improvements (e.g., lowering of a total risk score and/or an accompanying characterization) and/or deterioration (e.g., raising of a total risk score and/or an accompanying characterization) in the risk characterization for the software application after modifications to the software application during development.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A system, comprising:
a processor; and
a non-transitory storage medium storing instructions executable on the processor to:
calculate an impact component score and a likelihood component score for a security vulnerability during development of a software product based on a plurality of scored descriptions of security risk elements for the software product, the impact component score representing a potential impact of exploitation of the security vulnerability, the likelihood component score including a probability of occurrence of the exploitation of the security vulnerability, wherein the plurality of scored descriptions comprise a first scored description of a reproducibility of the security vulnerability, and a second scored description of a level of control ceded and a corresponding amount of damage of an integrity of an entity associated with the software product incurred by the exploitation of the security vulnerability;
calculate a total security risk score for the software product based on the impact component score and the likelihood component score for the security vulnerability of the software product; and
assign a risk characterization to the software product based on where the total risk score falls within a predetermined scale.

2. The system of claim 1, wherein the instructions are executable on the processor to calculate the total security risk score for the software product by multiplying the impact component score by the likelihood component score.

3. The system of claim 2, wherein the impact component score is a sum of a plurality of weighted segment scores associated with an impact component.

4. The system of claim 2, wherein the likelihood component score is an arithmetic mean of a plurality of segment scores associated with a likelihood component.

5. The system of claim 1, wherein the plurality of scored descriptions further comprise a scored description of a skill level associated with the exploitation of the security vulnerability.

6. The system of claim 1, wherein the plurality of scored descriptions further comprise a scored description of a tenant or user affected by the exploitation of the security vulnerability.

7. The system of claim 1, wherein the plurality of scored descriptions further comprise a scored description of accessibility of an attack surface of the software product for the exploitation of the security vulnerability.

8. A non-transitory computer readable medium storing instructions executable by a processing resource to cause a computer to:
calculate an impact component score and a likelihood component score of a security vulnerability of a software application based on a plurality of scored segments of a comprehensive security coverage framework, the impact component score representing a potential impact of exploitation of the security vulnerability, the likelihood component score including a probability of occurrence of the exploitation of the security vulnerability, wherein the plurality of scored segments comprise a reconstructing segment scored based on a description of a reproducibility of the security vulnerability, and an impact potential segment scored based on a description of a level of control ceded and a corresponding amount of damage of an integrity of an entity associated with the software application incurred by the exploitation of the security vulnerability;
calculate a total security risk score for the software application based on the impact component score and the likelihood component score for the security vulnerability of the software application; and
display a risk characterization of the software application determined based on where the total security risk score lies within a predetermined scale.

9. The non-transitory computer readable medium of claim 8, wherein the impact potential segment is scored based on a description of a type and a sensitivity of data that could be improperly accessed by exploiting the security vulnerability.

10. The non-transitory computer readable medium of claim 8, wherein the impact potential segment is scored based on a description of an impact of an exploitation of the security vulnerability on availability of the software application.

11. The non-transitory computer readable medium of claim 8, wherein the plurality of scored segments further comprise an attack vectors segment scored based on a description of a skill level associated with an exploitation of the security vulnerability of the software application.

12. The non-transitory computer readable medium of claim 8, wherein the plurality of scored segments further comprise an attack vectors segment scored based on a description of a level of access to exploit the security vulnerability of the software application.

13. The non-transitory computer readable medium of claim 8, wherein the plurality of scored segments further comprise a coverage spread segment scored based on a description of at least one of a tenant and a user affected by an exploitation of the security vulnerability of the software application.

14. The non-transitory computer readable medium of claim 8, wherein the plurality of scored segments further comprise an identify and exploit segment scored based on a description of a level of skill to identify the security vulnerability and a level of accessibility associated with a vulnerable surface of the software application.

15. A method performed by a system comprising a hardware processor, the method, comprising:
calculating an impact potential segment score, a reconstructing segment score, and an identify and exploit segment score for an exploit of a security vulnerability of a software product based on corresponding scored descriptions of security risk elements, the impact potential segment score based on a description of a type and a sensitivity of data that could be improperly accessed by the exploit of the security vulnerability, the reconstructing segment score based on a description of a reproducibility of the security vulnerability, and the identify and exploit segment score based on a description of a level of skill to identify the security vulnerability and a level of accessibility associated with a vulnerable surface of the software product;
calculating a total security risk score for the software product based on the impact potential segment score, the reconstructing segment score, and the identify and exploit segment score;
assigning a risk characterization to the software product based on where the total security risk score falls with a predetermined scale; and comparing the risk characterization for the software product to a historical risk characterization.

16. The method of claim 15, wherein scoring the impact potential segment score includes identifying as the impact potential segment score a greatest score associated with a portion of scored descriptions describing a confidentiality impact security risk element, an integrity impact security risk element, and an availability impact security risk element.

17. The method of claim 15, wherein scoring the identify and exploit segment score includes calculating an arithmetic mean of scores associated with a portion of scored descriptions describing an attack skill level risk element and an access vector risk element.

18. The method of claim 15, further comprising calculating an attack vectors segment score based on a description of a skill level associated with the exploit of the security vulnerability,
wherein the total security risk score is calculated further based on the attack vectors segment score.

19. The method of claim 15, further comprising calculating a coverage spread segment score based on a description of a tenant or user affected by the exploit of the security vulnerability,
wherein the total security risk score is calculated further based on the coverage spread segment score.

* * * * *